Dec. 17, 1929.  E. A. CHASE  1,740,154
MACHINE FOR FINISHING STONE
Filed April 28, 1924  12 Sheets-Sheet 2

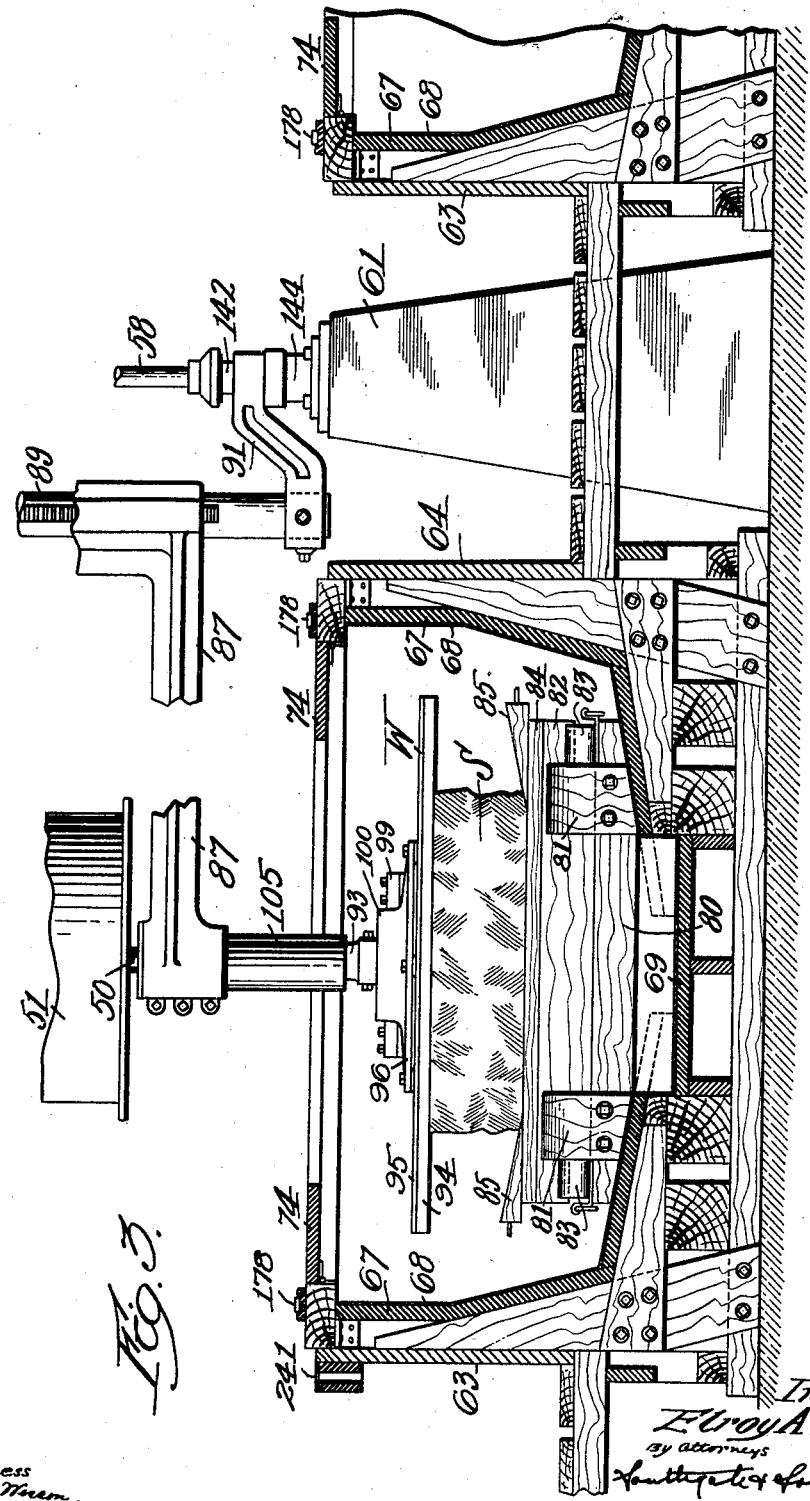

Dec. 17, 1929.  E. A. CHASE  1,740,154
MACHINE FOR FINISHING STONE
Filed April 28, 1924  12 Sheets-Sheet 4
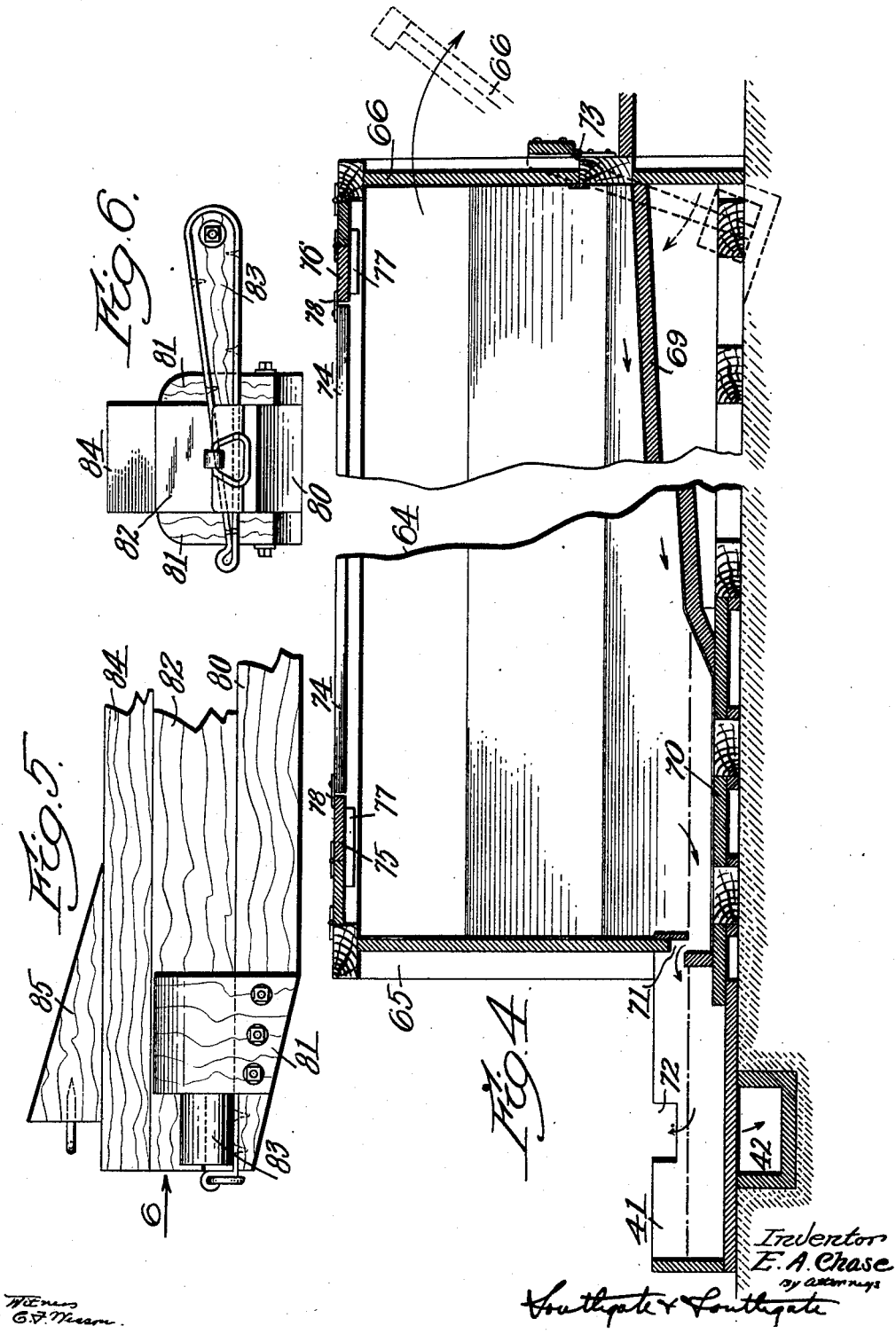

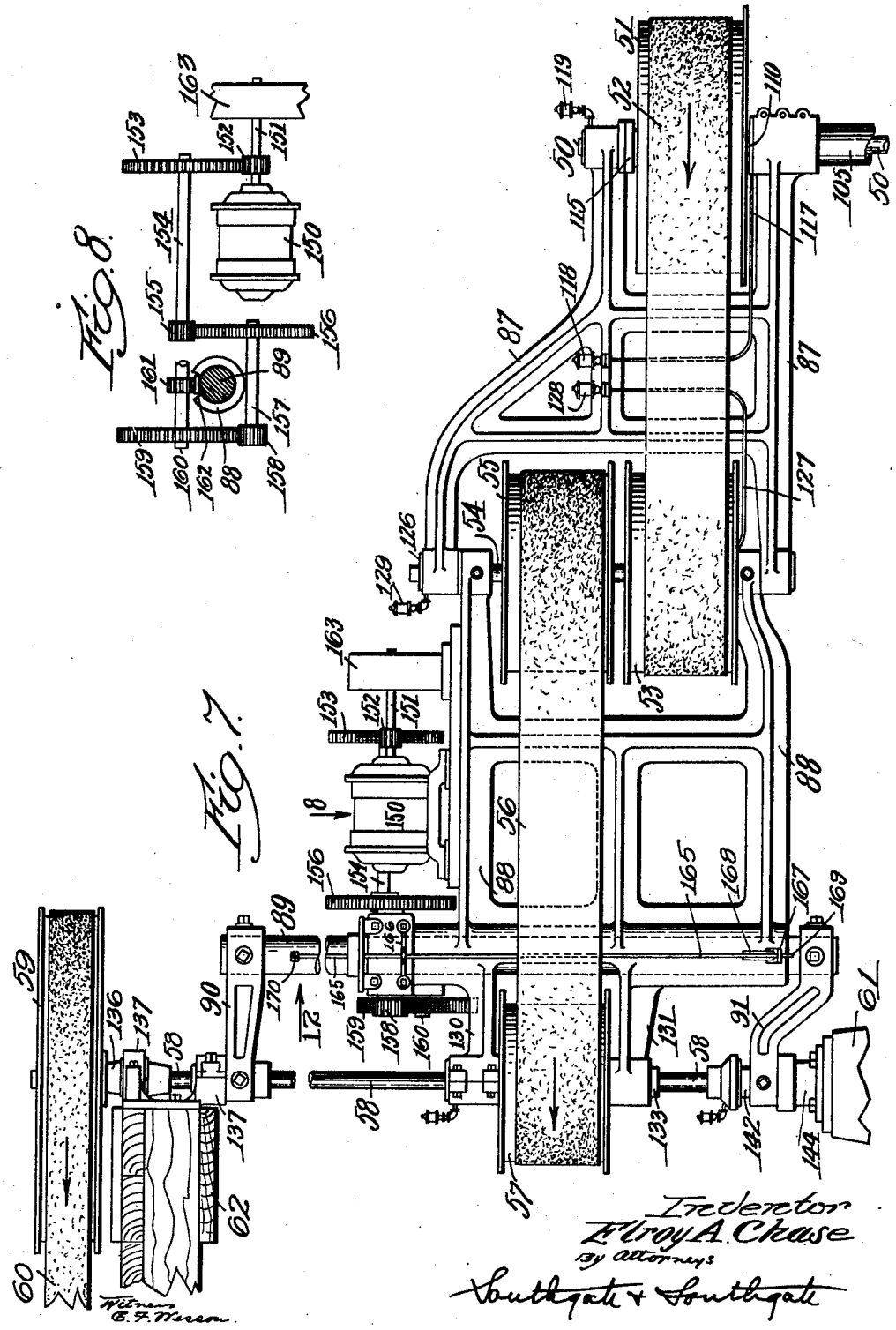

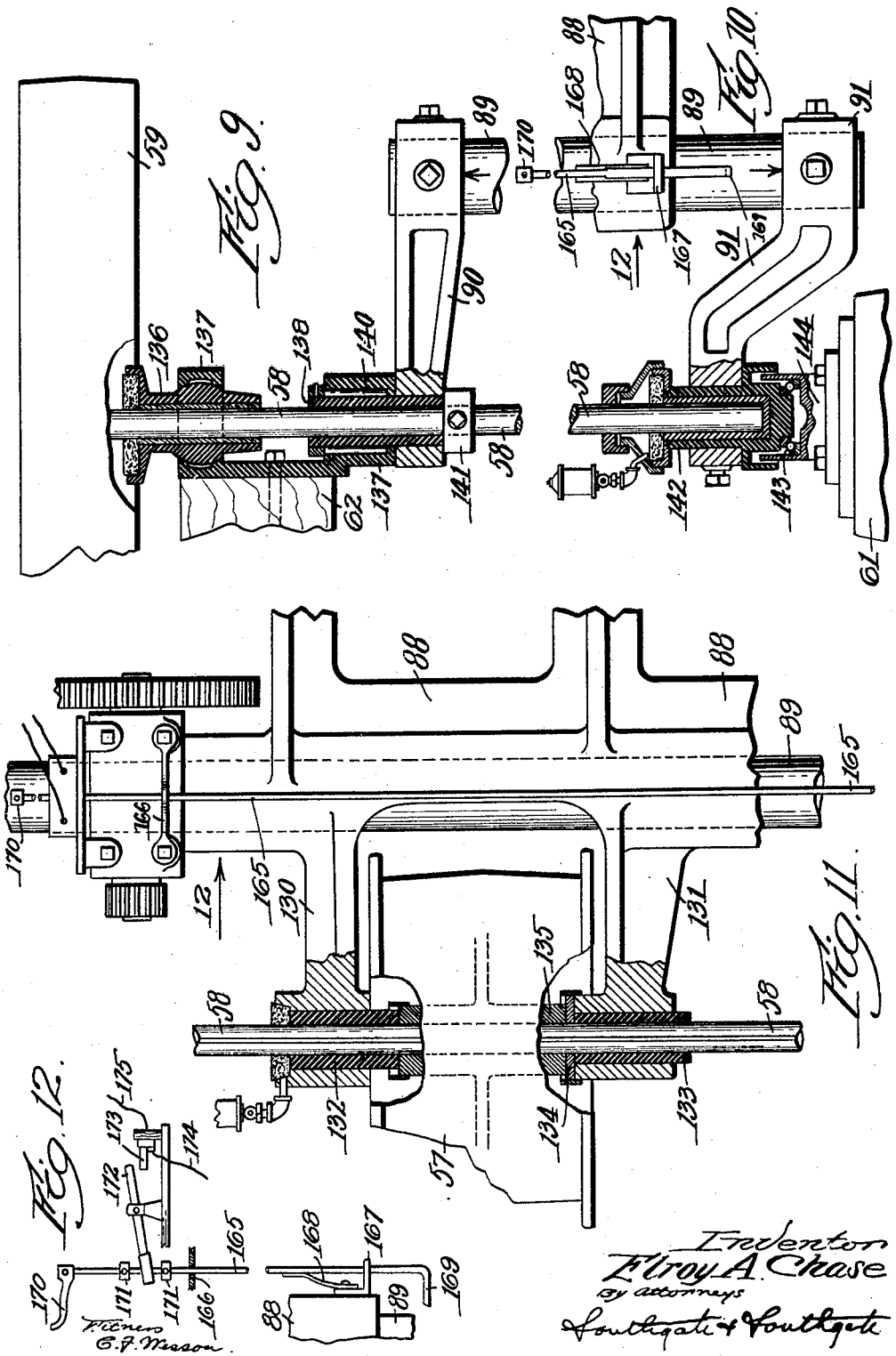

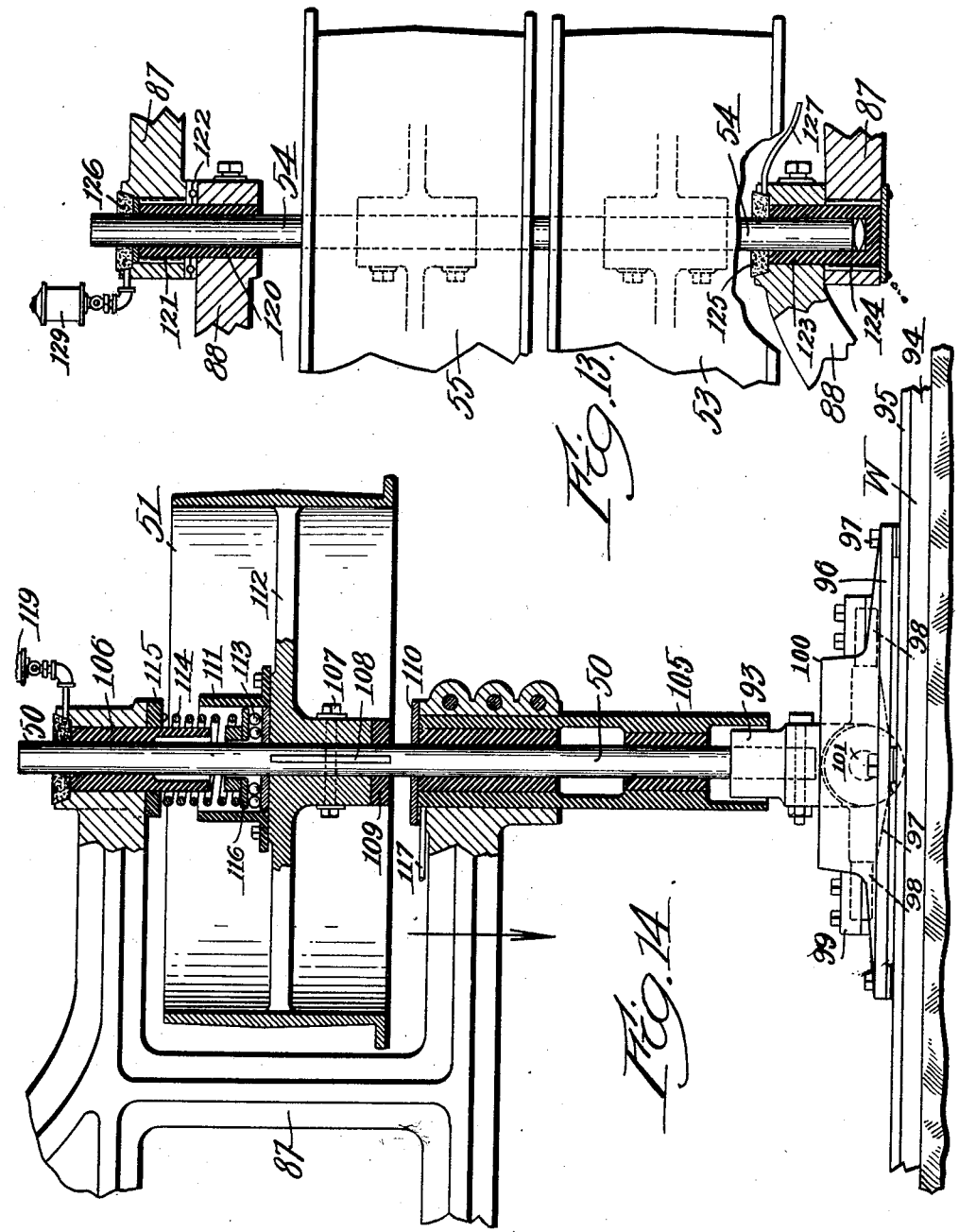

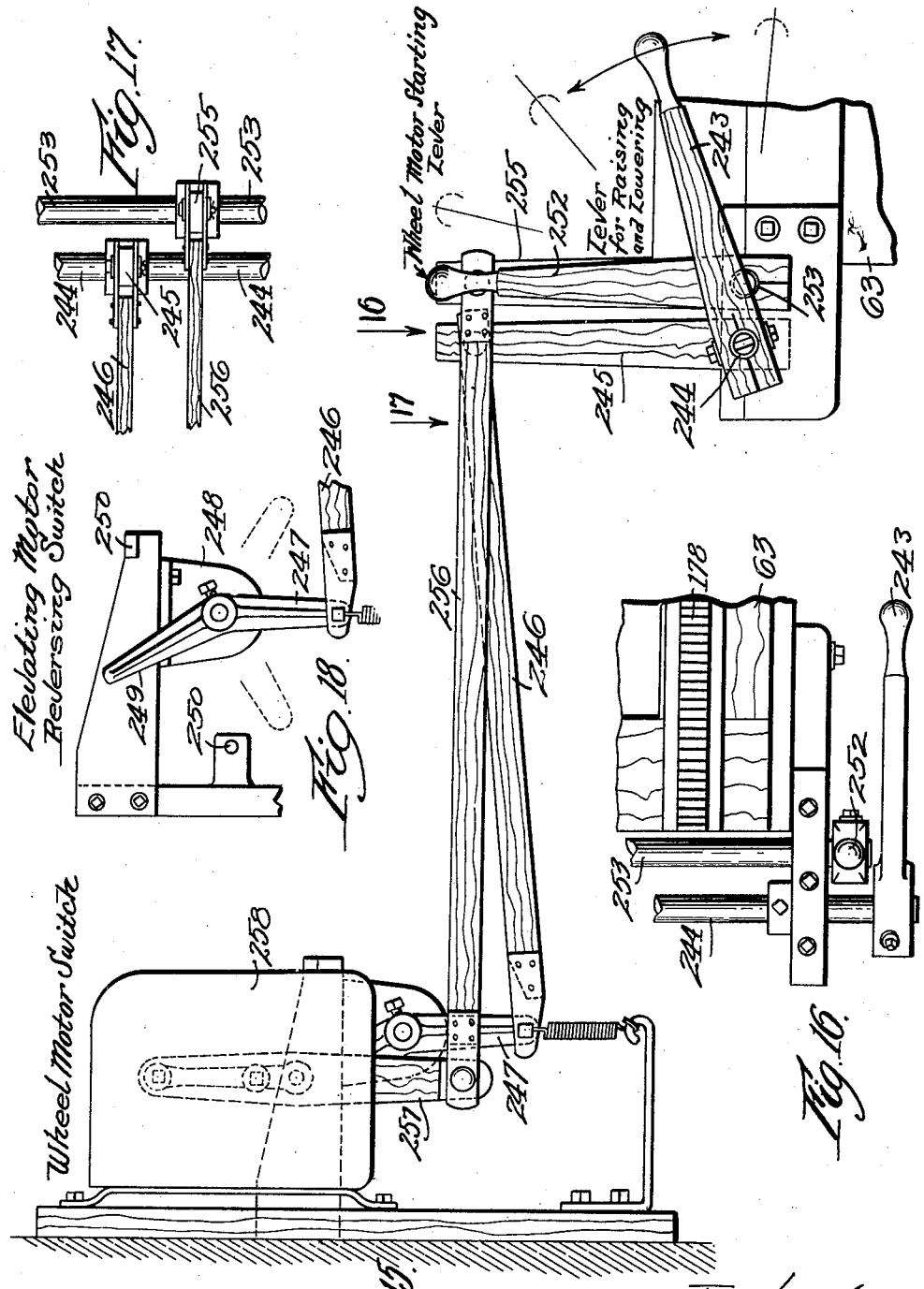

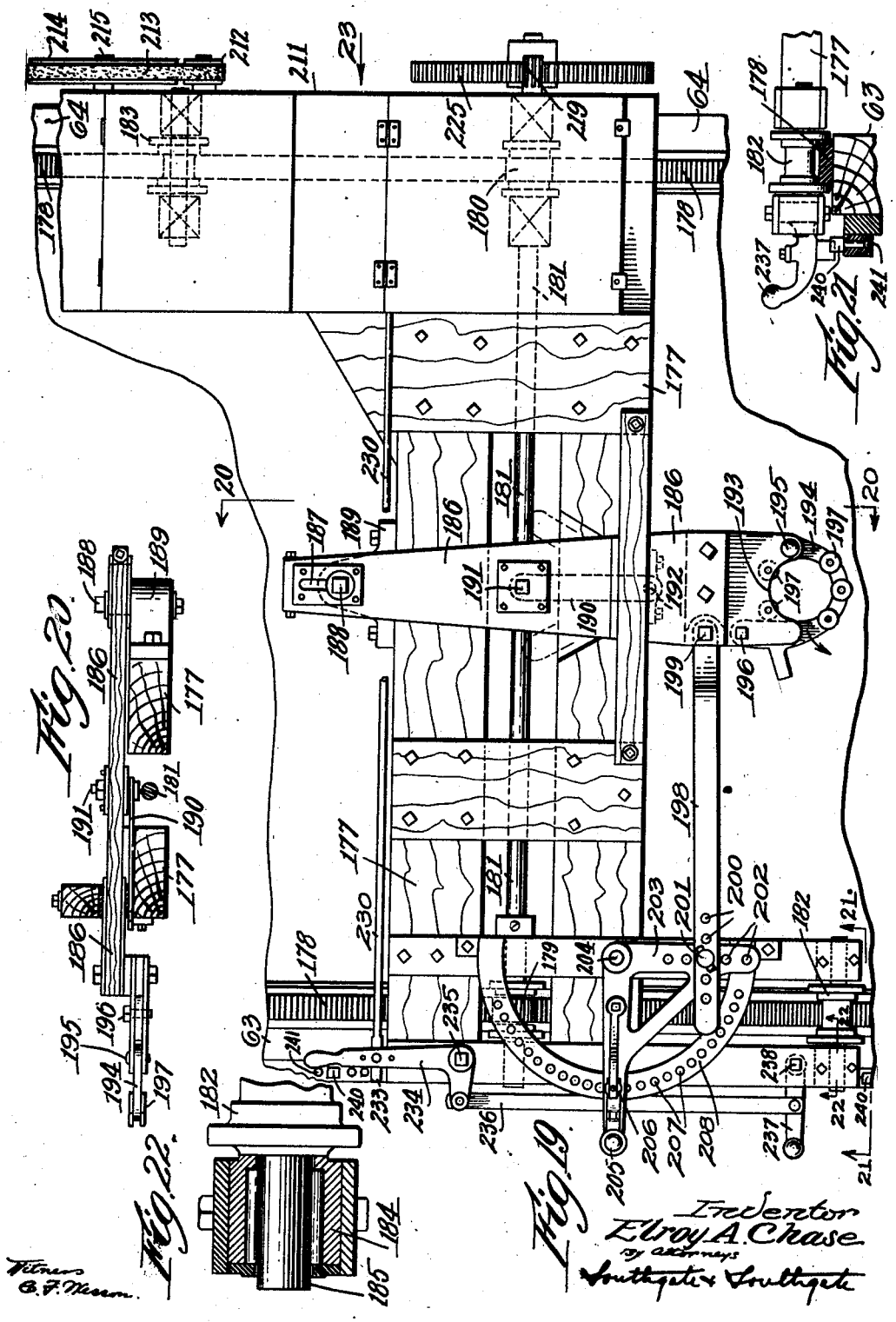

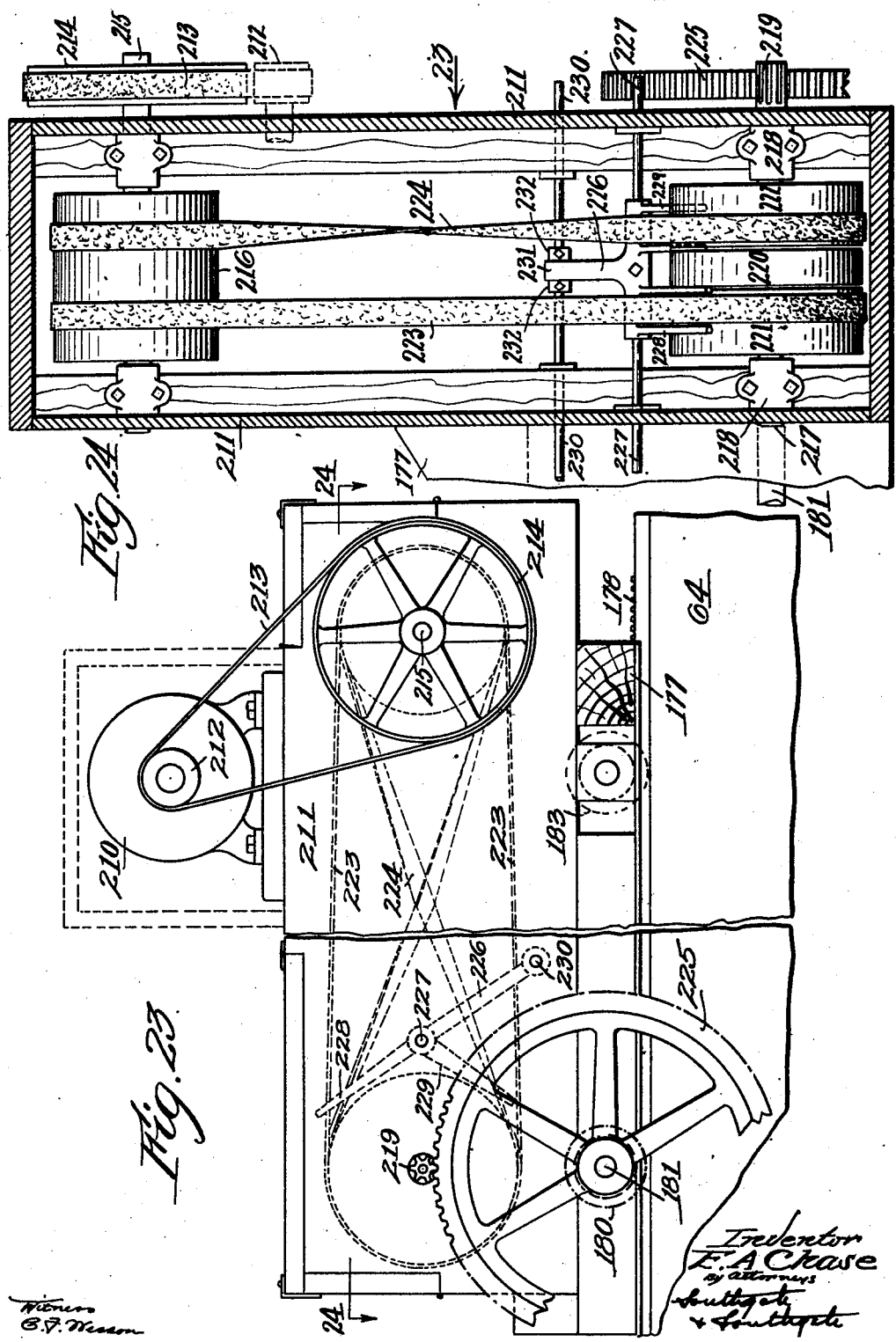

Dec. 17, 1929.                E. A. CHASE                1,740,154
                      MACHINE FOR FINISHING STONE
                  Filed April 28, 1924    12 Sheets-Sheet 11
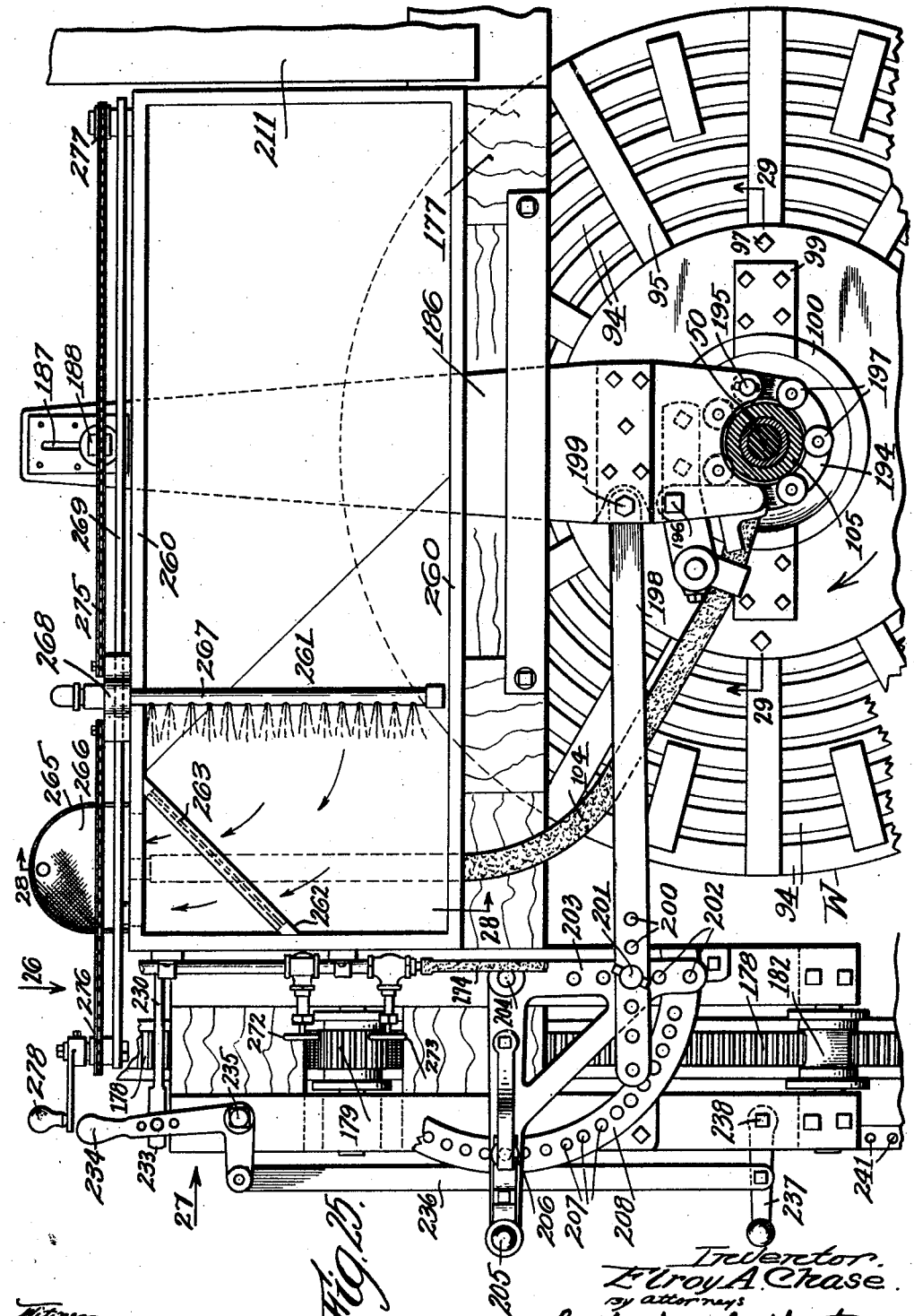

Dec. 17, 1929.  E. A. CHASE  1,740,154
MACHINE FOR FINISHING STONE
Filed April 28, 1924  12 Sheets-Sheet 12
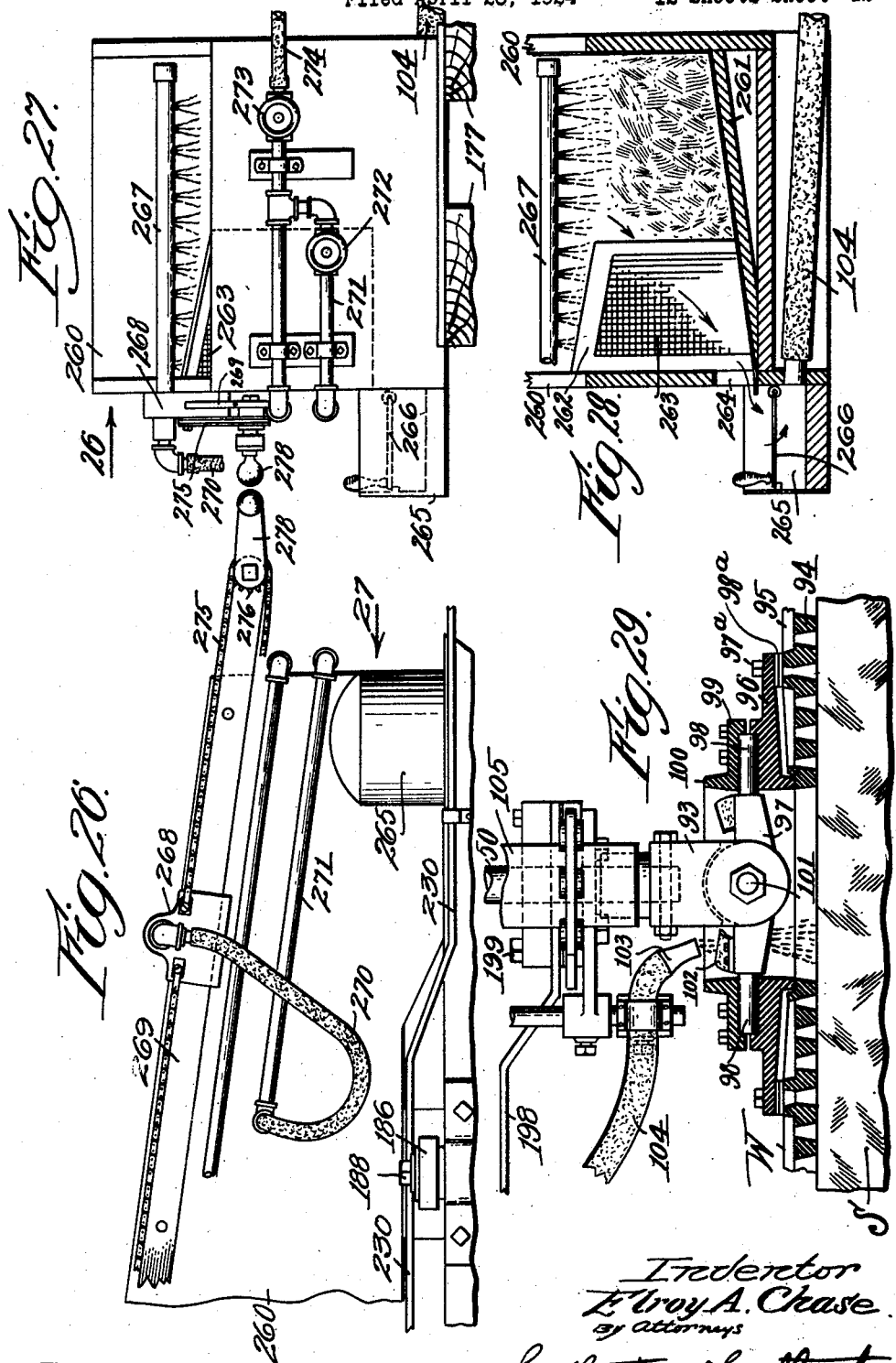

Patented Dec. 17, 1929

1,740,154

UNITED STATES PATENT OFFICE

ELROY A. CHASE, OF NORTHFIELD, VERMONT

MACHINE FOR FINISHING STONE

Application filed April 28, 1924. Serial No. 709,379.

This invention relates to a machine for finishing stone and more particularly to a machine for use on large single blocks of granite. The finishing of such granite blocks is commonly performed in several successive operations, known as coarse grinding, polishing and buffing. The machines heretofore used for these operations have been of comparatively light and inefficient construction and the grinding or polishing wheels have been moved about manually over the work.

It is the general object of my invention to provide a finishing machine of greatly improved mechanical construction, capable of operating at a higher speed than has been heretofore customary, and also capable of producing more efficient results.

A more specific object of my invention is to provide mechanical means for moving the wheel about over the work, and automatic reversing mechanism for controlling such movements of the wheel, together with means for increasing or decreasing the pressure of the wheel on the work, at the will of the operator.

Other objects of my invention are to provide improved feeding mechanism by which the coarse abrasive or other finishing material may be effectively applied to the wheel and work, to provide a construction of bin or trough from which the finishing material in certain instances may be reclaimed for further use; to provide improved means for supporting a block of stone in one of the bins, and to provide improved driving mechanism for the wheel, together with convenient and efficient controlling devices for the several parts of the machine.

With these and other objects in view, my invention further relates to arrangements of parts and combinations of mechanism which are hereinafter fully disclosed and described and the several features of which are more particularly pointed out in the appended claims.

A preferred form of my invention is shown in the drawings, in which

Fig. 3 is a partial transverse sectional elevation, taken along the line 3—3 in Fig. 2;

Fig. 4 is a longitudinal sectional elevation of one of the bins or enclosing structures, taken along the line 4—4 in Fig. 2;

Fig. 5 is a partial front elevation of one of the stone supports;

Fig. 6 is a detail side elevation thereof, looking in the direction of the arrow 6 in Fig. 5;

Fig. 7 is a side elevation of the connections to one of the grinding units and the driving mechanism for the unit;

Fig. 8 is a diagrammatic plan view of the wheel elevating mechanism, looking in the direction of the arrow 8 in Fig. 7;

Figs. 9, 10 and 11 are enlarged partial side elevations, partly in section, of portions of the wheel supporting frame and the bearings thereof;

Fig. 12 is a side elevation of a safety device, looking in the direction of the arrow 12 in Figs. 7 and 11;

Fig. 13 is a sectional side elevation, partly in section and showing the bearings for the intermediate shaft on the wheel supporting frame;

Fig. 14 is a sectional side elevation, partly in section and showing the wheel shaft bearings and other parts associated therewith;

Fig. 15 is a side elevation, looking in the direction of the arrow 15 in Fig. 2, and showing the controlling levers and connections for the wheel elevating and moving mechanism;

Figure 2:
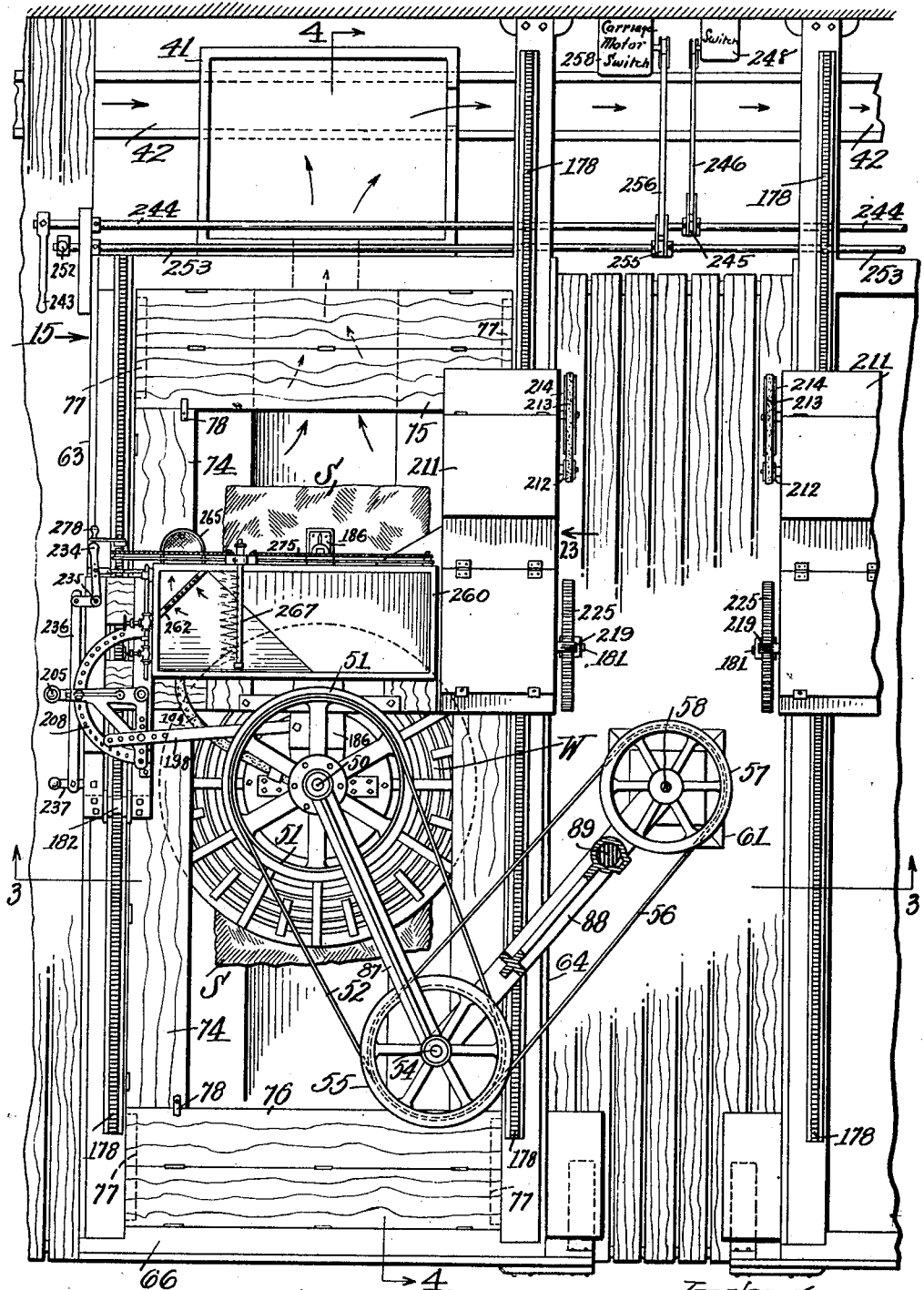
Fig. 2 is a plan view of one of my improved machines and one of the bins in which the wheel operates.

Figs. 16 and 17 are detail plan views of parts of this controlling mechanism, looking in the direction of the arrows 16 and 17 in Fig. 15;

Fig. 18 is a detail side elevation of the connections to the reversing switch of the elevating motor;

Fig. 19 is a plan view of the wheel-traversing carriage;

Fig. 20 is a transverse sectional elevation thereof, taken along the line 20—20 in Fig. 19;

Figs. 21 and 22 are detail sectional views taken along the lines 21—21 and 22—22 in Fig. 19;

Fig. 23 is a side elevation of one of the wheel moving carriages, looking in the direction of the arrow 23 in Figs. 2 or 19;

Fig. 24 is a sectional plan view thereof, taken along the line 24—24 in Fig. 23;

Fig. 25 is a plan view of a portion of one of the wheel carriages, with an automatic abrasive feeding device applied thereto;

Fig. 26 is a partial rear elevation, looking in the direction of the arrow 26 in Figs. 25 and 27;

Fig. 27 is an end elevation of the feeding device, looking in the direction of the arrow 27 in Figs. 25 and 26;

Fig. 28 is a sectional end elevation, taken along the line 28—28 in Fig. 25; and Fig. 29 is a sectional elevation of a grinding wheel, taken substantially along the line 29—29 in Fig. 25.

General operation

Figure 1:
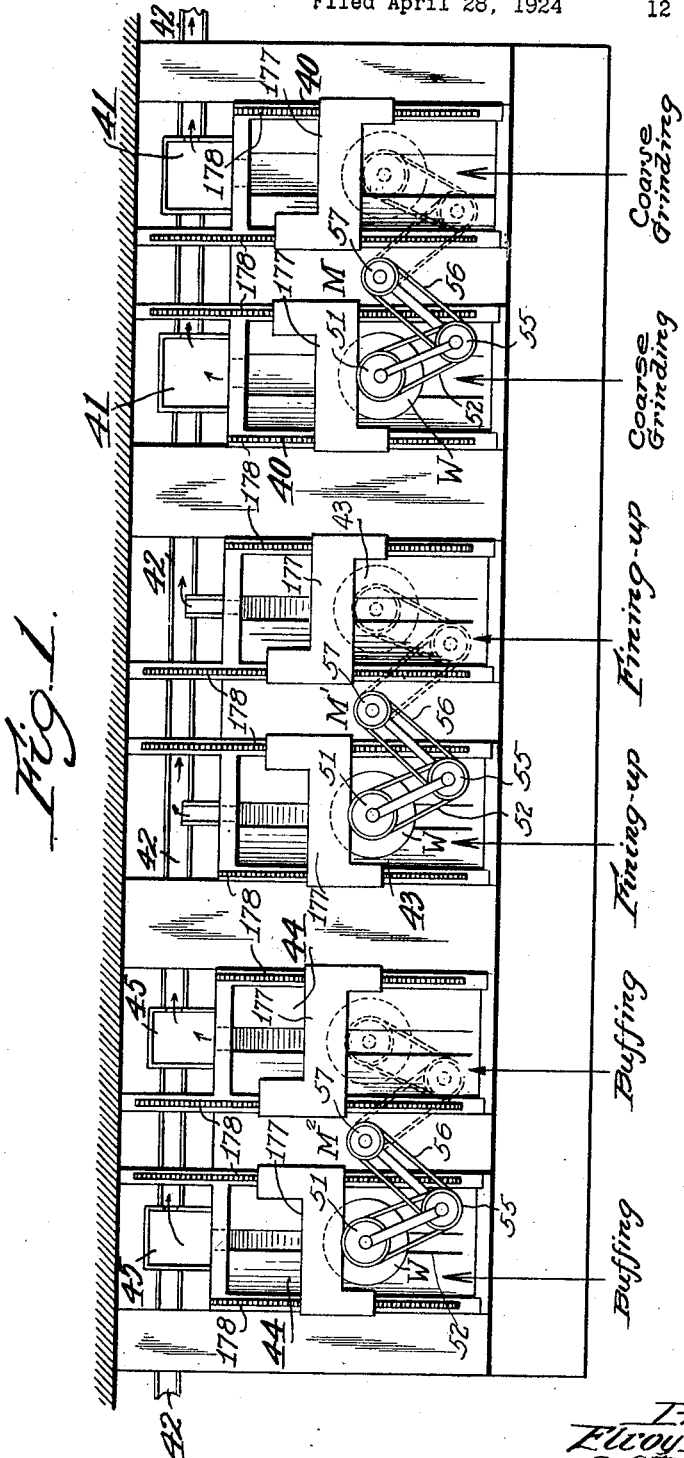
Fig. 1 is a diagrammatic plan view showing a relative arrangement of the successive machines used in the complete finishing process.

Referring to Fig. 1, I have indicated a preferred arrangement in which my improved machines may be very effectively operated to produce a very large output of finished stone. Each of the machines, indicated generally at M, M' and M², is mounted between two troughs or bins in either of which a large block of granite may be supported for operation of the associated machine thereon. By providing duplicate bins, a stone may be operated upon in one bin, while a finished stone is being removed from the other bin and a new or unfinished stone is being substituted therefor. In this way, the operation of each machine may be made substantially continuous and lost machine time due to the resetting of the stones is substantially eliminated.

In Fig. 1 the machine M at the right hand end of the drawing is designed for the coarse grinding operation, while the middle machine M' is used for the second or fining-up operation, and the third or left hand machine M² is used for the final or buffing operation.

The water and abrasive from the troughs or bins 40 for the first machine M run into settling tanks 41, the overflow of which is discharged into a drain 42. The bins 43 for the intermediate or fining-up machine M' preferably overflow directly into the drain 42, as the abrasives used in this machine are of successively finer grades and it is not considered economical to attempt to reclaim small quantities of different grades of abrasive. The overflow from the bins 44 of the buffing machine M² is received in settling tanks 45 from which the surplus water flows into the drain 42.

With the arrangement of machines indicated in Fig. 1 and using the machines more fully set forth and described in the following specification, three operators are able to easily produce a much greater output of polished granite than could be produced by two or three times as many workmen using the machines and arrangements previously common in this art.

In Figs. 2, 3 and 7, I have indicated the general relation of a finishing machine to the bins or troughs in which the work is supported. The machine selected for illustration is the coarse grinding machine M, shown at the right in Fig. 1, but the construction of the fining-up and buffing machines is substantially the same, except for differences of driving speed and for the use of different work-engaging wheels.

A coarse grinding ring wheel W (Fig. 3) is mounted at the lower end of a wheel shaft 50 (Fig. 7) which is provided with a wide face driving pulley 51 which is rotated by a belt 52 from a pulley 53 on an intermediate shaft 54. A second pulley 55 on the shaft 54 is connected by a belt 56 to a driving pulley 57 on a main shaft 58 which may be rotated in any convenient manner, as by a large pulley 59 and belt 60 driven from a motor not shown. The grinding machine thus broadly indicated is preferably supported upon a heavy cement foundation 61 (Fig. 3) and the upper portion thereof is secured to a rigid framework 62 (Fig. 7).

Work-enclosing bins

Each block of stone S is preferably supported in a bin, comprising fixed side walls 63 and 64 (Fig. 3), a fixed end wall 65 (Fig. 4), and a movable end wall 66. The sides and bottom of the bin are provided with closely jointed lining surfaces 67 and these lining surfaces, together with the end walls 65 and 66, are preferably sheathed with copper or other sheet metal as indicated at 68.

The bottom 69 of the bin is downwardly inclined rearwardly as indicated in Fig. 4 and is also depressed below the level of the lining surfaces 67, forming a longitudinal drainage portion, as is evident in Fig. 3.

A depressed portion 70 (Fig. 4) of the bottom 69 provides a pocket or recess in which a considerable portion of the abrasive and other solid matter is collected. The overflow from the pocket or depression 70 escapes through a passage 71 (Fig. 4) to the settling tank 41 previously described. Additional solid matters collect in the settling tank 41 and the overflow therefrom escapes through a spill-way 72 to the drain 42.

The movable or front end 66 of the bin is hinged at 73 (Fig. 4) and is adapted to be swung forward to permit convenient removal and replacement of the blocks of stone S.

Provision is made for covering the bin after the stone S has been placed therein, and for this purpose side cover boards 74 (Fig. 3) are hinged to the side walls 63 and 64 and double end cover boards 75 and 76 (Fig. 4) are hinged to the end walls 65 and 66. Reference to Fig. 2 will indicate that the double or end cover boards 75 and 76 extend entirely across the bin and rest upon blocks 77 secured to the side walls 63 and 64 as indicated in Figs. 2 and 4.

The side cover boards 74 extend between the end cover boards 75 and 76, and are provided with buttons or plates 78 by which their inner edges are supported upon the end boards. In uncovering the bin, the buttons 78 are first turned to release the side covers 74, which then swing downward inside of the bin, after which the end covers are swung upward and outward.

The stone S may be supported within the bin in any convenient manner but I have shown herein a heavy lower cross frame member 80 (Fig. 3) with its ends resting upon the inclined bottom of the bin and having guide members 81 (Figs. 5 and 6) for upper supporting members 82. Wedges 83 are inserted between the ends of the lower frame member 80 and the upper member 82 and provide for separately adjusting the opposite ends of the member 82. A renewable top wearing surface 84 may be provided for the upper member 82, and supplementary wooden wedges 85 may be used for blocking the stone in position. Commonly two or more of the cross frame members 80 are used, which may be separately adjusted to bring the stone to the desired level.

Wheel driving mechanism

Referring more in detail to the wheel driving mechanism, the wheel shaft 50 (Fig. 7) is rotatably mounted in the end of a swinging frame or bracket 87, which is pivoted on the intermediate shaft 54 at the end of a second swinging frame 88. The frame 88 is vertically slidable upon an upright rack bar 89 secured by rigid arms 90 and 91 for angular movement about the axis of the driving shaft 58. The details of construction of the wheel driving mechanism are fully shown in Figs. 9 to 14 inclusive and Fig. 29 of the drawings.

The wheel W (Fig. 29) has a universal connection with a driving head 93 which, in turn, is secured to the lower end of the wheel shaft 50. The grinding face of the wheel W is composed of a plurality of concentric rings 94 secured together by radial arms 95 and fastened to a plate or disc 96 by bolts 97ª. Cushion washers 98ª may be interposed between the arms 95 and the disc 96.

A rocker 97 is provided with cylindrical end bearing members 98 which are pivotally secured in recesses between the disc 96 and a cap 99 having an upwardly extended flange 100. The driving head 93 is pivotally connected to the rocker 97 by a bearing stud 101 extending transversely to the axis of the rocker 97. Pieces of leather or other flexible material 102 may be secured to the upper surface of the rocker 97 and assist in guiding the abrasive material downward through the central opening of the grinding wheel, as the abrasive is delivered from a nozzle 103 connected by a hose 104 to a feeding device to be hereinafter described.

The wheel supporting frame member 87 (Fig. 14) is provided with an extended lower bearing sleeve 105 in which the wheel shaft 50 is freely rotatable and in which it is also capable of limited axial movement. The frame 87 is also provided with an upper bearing sleeve 106 for the upper end of the shaft 50.

The driving pulley 51 is secured to the shaft 50 by a bolt 107 and key 108, and a bronze collar 109 is mounted on the shaft 50 below the hub of the pulley 51 and engages a thrust plate 110 when the frame member is raised to lift the wheel from the work. The plate 110 is supported upon the upper surface of the lower bearing arm on the frame member 87.

A flanged collar 111 is bolted to the upper surface of the web 112 of the pulley 51 and forms a cage for a ball thrust bearing 113. A heavy coil spring 114 surrounds the extended lower end of the upper bearing sleeve 106, and the upper end of the spring engages a thrust plate 115 on the under side of the upper bearing arm of the frame member 87. At its lower end the spring 114 rests upon a plate 116 supported by the ball bearing 113. The spring 114 thus exerts downward pressure against the web of the pulley 51 and through the shaft 50 to the grinding wheel W.

Provision is made for raising and lowering the frame and for forcing the frame 87 downward to increase the pressure of the wheel on the work when desired and this frame elevating mechanism will be hereinafter described. The lower bearing 105 of the shaft 50 may be connected by a pipe 117 to an oil cup 118 (Fig. 7) and the upper bearing may be similarly provided with a suitable oil cup 119.

The connections between the swinging frame members 87 and 88, and the bearings for the intermediate shaft 54 are best shown in Fig. 13. The upper arm of the frame member 88 has a bearing sleeve 120 fixed therein and extending upwardly therefrom to receive a roller bearing 121 mounted in the upper arm of the outer frame member 87. A ball thrust bearing 122 is interposed between the arms of the frame members 87 and 88 and carries the weight of the grinding wheel W and frame member 87 when the wheel is raised from the work.

The lower arm of the frame member 88 has a depending bearing member 123 fixed therein and extending downward into a second roller bearing 124 in the lower arm of the frame member 87. The bearing sleeve 123 is preferably closed at its lower end and forms a cup-like bearing for the lower end of the intermediate shaft 54. Felt washers 125 and 126 prevent the entrance of dirt and abrasive into the bearings of the shaft 54, and the lower bearing is connected by a pipe 127 to an oil cup 128 (Fig. 7), the upper bearing being similarly provided with an oil cup 129.

Referring to Fig. 11, the driving pulley 57 is keyed to the driving shaft 58 and is slidable thereon as the wheel supporting frame 88 is raised and lowered. Brackets 130 and 131 extend rearward from the swinging frame 88 and are provided with bearing sleeves 132 and 133 above and below the pulley 57. A thrust plate 134 is interposed between the lower end of the hub 135 of the pulley 57 and the upper face of the bearing bracket 131. This thrust plate 134 thus supports the weight of the pulley 57, as the frame 88 is raised and lowered.

The upper bearing for the driving shaft 58 is shown in Fig. 9 and comprises a bearing sleeve 136 having a swivel support in the upper arm of a bearing bracket 137 fixed upon the rigid framework 62 (Fig. 7). A second bearing sleeve 138 (Fig. 9) for the shaft 58 is fixed in the end of the arm 90 which is secured to the upper end of the rack bar 89. The sleeve 138 extends upward through a roller bearing 140 in the lower arm of the bearing bracket 137 and thus forms a pivotal support for the arm 90. The sleeve 138 at the same time forms a running bearing for the shaft 58. A collar 141 is fixed to the shaft 58 below the arm 90 and prevents relative upward movement of the shaft. The main driving pulley 59 is secured to the upper end of the shaft 58 as previously described.

A bearing sleeve 142 (Fig. 10) is fixed in the lower arm 91 which supports the rack bar 89. This bearing sleeve 142 has an inner bearing for the lower end of the shaft 58 and also has an outer ball bearing 143 in a base plate 144 which is preferably mounted upon the cement foundation 61. This ball bearing 143 is designed to resist both axial and transverse pressures and carries the weight of the entire wheel supporting frame, except as a portion of the weight may at times be supported by the wheel when in engagement with the work.

Wheel elevating mechanism

Special provision is made for raising and lowering the frame 88 on the rack bar 89, this mechanism being best shown in Figs. 7 and 8. A motor 150 has an armature shaft 151 provided with a pinion 152 engaging a gear 153 on an intermediate shaft 154. A pinion 155 on the shaft 154 engages a gear 156 on a second intermediate shaft 157 having a pinion 158 which engages a gear 159 on a shaft 160. A pinion 161 on the shaft 160 engages a rack 162 fixed to the side of the rack bar 89. The motor 150 is of the reversing type and may be rotated in either direction to turn the pinion 161 through the reduction gearing above described and to thus move the wheel frame 88 upward or downward along the rack bar 89. A magnetic brake 163 is provided on the armature shaft 151 and acts to hold the shaft from rotation, as soon as the motor 150 ceases to operate. The brake 163 is of a usual commercial construction and in itself forms no part of my invention.

In order to prevent excessive raising or lowering of the wheel frame 88, I provide a safety attachment best shown in Figs. 7, 11 and 12. A rod 165 is slidably mounted in upper and lower bearings 166 and 167 (Figs. 11 and 12) and is frictionally retained in longitudinal position in said bearings by a flat spring 168. An offset lower portion 169 (Fig. 12) of the rod 165 engages an upper surface on the arm 91 (Fig. 10) as the frame 88 and rod 165 move downward, and an upper arm 170 (Fig. 12) correspondingly engages the under surface of the arm 90 (Fig. 9). Collars 171 (Fig. 12) are secured in spaced relation on the rod 165 and are positioned to engage a switch lever 172 at their opposite limits of travel. When the lever 172 is in mid-position, it contacts with members 173 and completes the circuit between wires 174 and 175 which control the operation of the elevating motor 150. The motor will thus be stopped whenever the travel of the wheel supporting frame 88 reaches a predetermined point in either direction and opens the switch, thus preventing the operator from over-running the motor in either raising or lowering the grinding wheel W.

Wheel carriage

An important feature of my machine consists in the provision of a wheel carriage by which the grinding wheel may be reciprocated automatically lengthwise of the grinding bin. A separate wheel carriage is provided for each of the grinding bins but a description of one of these carriages will be sufficient, as the carriages for all the bins are substantially identical, except for being of right and left hand construction.

Referring to Figs. 19 and 20, my improved wheel carriage comprises a base or platform 177 supported upon the side walls 63 and 64 of the grinding bin. Racks 178 are mounted on the top edges of the side walls and are engaged by pinions 179 and 180 fixed on a cross shaft 181 rotatably mounted in bearings beneath the platform or frame 177. A roll 182 (Fig. 21) supports the front left hand forward projection of the carriage and a similar roll 183 supports a right hand rear projection of the carriage. These rolls 182 and 183 engage the smooth edge portions of the rack bar 178 but are recessed to clear the rack teeth, as indicated in Fig. 21. Roller bearings 184 (Fig. 22) may be provided for the journal portions 185 of the rolls 182 and 183 and similar roller bearings may also be provided for the shaft 181 if so desired.

The platform 177 supports a draw-bar 186 (Fig. 19) having a slot 187 at its rear portion to receive a stud or bolt 188 fixed in a bracket 189 secured to the rear side of the platform 177. A link 190 is pivoted at 191 to the draw-bar 186 and is also pivoted at 192 to the platform 177 at the front edge thereof.

At its front end, the draw-bar 186 is recessed as indicated at 193 to receive the lower end of the bearing sleeve 105 (Fig. 14) at the free or swinging end of the wheel supporting frame member 87. A latch 194 is pivoted at 195 to the front end of the draw-bar 186 and the free end of the latch is detachably secured to the draw-bar by a locking pin 196. The latch 194 is preferably formed of several separate elements pivotally connected as indicated in Fig. 19 and both the latch 194 and the front end of the draw-bar 186 may be provided with anti-friction rolls 197 to engage the sleeve 105.

A link 198 (Fig. 19) is pivotally connected at 199 to the draw-bar 186 and is provided at its opposite end with a plurality of holes 200 to receive a stud or pin 201 which in turn may be inserted in any one of a plurality of holes 202 in a bell crank 203 pivoted at 204 on the platform 177. A handle portion 205 extends outward from the bell crank and is provided with a spring-actuated stud 206 adapted to be inserted in any one of a series of holes 207 in a semi-circular segment plate 208 fixed to the platform 177.

By raising the locking pin 206, the bell crank is released and may be moved to swing the draw-bar either to the left or to the right as viewed in Fig. 19, and the draw-bar may be secured in any adjusted position. The range of movement may be increased or decreased by selecting different holes 202 and the locus of movement may be varied by selecting different holes 200. The pin and slot connection of the rear end of the draw-bar 186 to the bracket 189 and the link connection of the front end to the pivot 192 produces a substantially straight line lateral movement of the front end of the draw-bar and consequently of the wheel shaft and wheel controlled thereby. The wheel adjusting mechanism thus provides for convenient transverse adjustment of the grinding wheel to center the same over any desired portion of the stone S.

Carriage driving mechanism

The mechanism for moving the wheel carriage backward and forward along the top of the grinding bin is best shown in Figs. 23 and 24. A motor 210 (Fig. 23) is mounted at the top of a casing 211 and is provided with a pulley 212 connected by a belt 213 to a large pulley 214 on a cross shaft 215. The shaft 215 extends through the casing 211 and is provided with bearings therein, between which bearings is mounted a wide face drum 216 (Fig. 24). A pinion shaft 217 is mounted in bearings 218 at the front of said casing 211 and is provided with a pinion 219 and with a tight pulley 220 fixed thereto. Loose pulleys 221 and 222 are also rotatably mounted on the shaft 217. A straight belt 223 connects the drum 216 to the loose pulley 221 and a cross belt 224 connects the drum 216 to the loose pulley 222. The pinion 219 engages a large gear 225 on the end of the carriage shaft 181 previously described.

A belt shipper 226 (Fig. 24) is secured to a sliding cross rod 227 and is provided with upwardly extending fingers 228 for the straight belt 223 and with downwardly extending fingers 229 for the cross belt 224. A shipper rod 230 extends through an arm 231 projecting rearward and downward from the belt shipper 226 and collars 232 on the shipper rod 230 engage the arm on both sides thereof.

The shipper rod 230 (Fig. 19) extends across the wheel carriage and is pivotally connected at its left hand end 233 to a bell crank lever and handle 234 pivoted to the carriage at 235. The bell crank lever 234 is connected by a link 236 to a reversing lever and handle 237 pivoted at 238 to the forwardly extended portion of the wheel carriage. Stop pins 240 may be placed in selected holes 241 (Fig. 3) in the top of the side wall 63 and engage the reversing lever 237 as the carriage approaches its desired limit of travel in either direction. Such engagement of the lever 237 shifts the belts 223 and 224 and thus automatically reverses the travel of the carriage. By properly locating stop pins 240 at both ends of the travel, the range of movement of the grinding wheel may be limited as desired.

In the coarse grinding operation the grinding wheel W is commonly of greater diameter than the width of the stone S, as shown in Fig. 3, and the wheel is reciprocated in a straight path back and forth over the stone, the wheel positioning lever 205 (Fig. 19) being used for centering the wheel over the stone. In the fining-up operation and also in the buffing operation, it may be desirable to shift the wheel laterally at each reversal of movement of the carriage.

Motor control

The mechanism for controlling the elevating motor 150 and the wheel driving motor is best shown in Figs. 15 to 18 inclusive. A hand lever 243 is fixed to a cross rod 244 which is mounted in bearings at the rear of the grinding bin, as shown in Fig. 2. An arm 245 is also fixed to the cross rod 244 and is connected by a link 246 to a lever 247 which controls the reversing switch 248 for the elevating motor 150. The lever 247 has an upwardly extending arm 249 adapted to engage one or the other of two limit stops 250. The lever 247 is shown in neutral position in Fig. 18 and when moved in either direction will start the elevating motor 150 to raise or lower the grinding wheel frame.

A second handle 252 (Figs. 2 and 15) is mounted on a cross rod 253 supported in bearings adjacent the rod 244 and having an arm 255 which is connected by a link 256 to a lever 257 which controls the starting switch 28 for the wheel driving motor.

The handles 243 and 252 are conveniently located closely adjacent to each other, so that the raising and lowering of the wheel frame and the rotation of the wheel itself may be conveniently controlled by the operator from a single point.

Abrasive feeding mechanism

In Figs. 25 to 28 inclusive, I have shown mechanism by which a coarse abrasive may be fed automatically to the grinding wheel W. For this purpose, I support a tank 260 upon the wheel carriage or platform 177. The bottom of the carriage is provided with a depressed portion 261 which is also inclined downward, as shown in Fig. 28, toward a diagonal partition 262 having a relatively coarse screen 263 mounted therein. An outlet 264 is provided behind the screen 263, through which the material which passes through the screen may escape to a receptacle 265 (Figs. 25 and 28) which projects rearwardly from the tank 260, and which is provided with a relatively fine screen 266.

The pipe 104 previously described connects the lower portion of the receptacle 265 with the nozzle 103 through which the abrasive flows to the center feed opening of the grinding wheel W.

A spray pipe 267 (Fig. 25) is mounted on a carriage 268 which is slidable longitudinally of the tank 260 on a track or drive-way 269 (Fig. 26). The spray pipe 267 is rigidly fixed in the carriage 268 and extends transversely of the tank, as shown in Figs. 25 and 27. The pipe 267 is provided with a plurality of openings spaced along its length, so that a number of fine streams of water can be caused to play over the abrasive material in the tank 260.

A flexible pipe 270 (Fig. 26) connects the spray pipe 267 to a supply pipe 271 (Figs. 26 and 27), and the flow of water through the spray pipe 267 may be controlled by a suitable valve 272. A second valve 273 controls the flow of water to a hose 274 which may be conveniently used for washing the wheel and the surface of the stone, or for delivering an increased supply of water to the wheel.

A chain 275 (Figs. 25 and 26) is mounted on sprocket wheels 276 and 277 and the ends of the chain are fixed to the carriage 268. A handle 278 (Fig. 25) is provided by which the sprocket wheel 276 may be turned to move the carriage 268 and adjust the spray pipe 267 along the tank 260.

The abrasive and water as it flows from the stone and from the grinding wheel collects in the depressed portion or pocket 70 (Fig. 4) of the bottom of the grinding bin and some of the finer portions thereof also collect in one of the settling tanks 41. The abrasive material is shoveled from the pocket 70 and from the tank 41 into the feeding tank 260, where it settles into a wet compact mass. The spray pipe 267 is set to play over the lower end of this compact mass of abrasive, washing it gradually down through the coarse screen 263 and through the fine screen 265 to the delivery pipe 104 by which it is fed to the wheel. The coarse screen 263 removes the larger pieces of stone and waste which may be found mixed with the abrasive, and the fine screen 265 removes any steel shot which may have been carried along on the stone from previous operations.

This automatic feed of the abrasive is found to be of very great advantage, when compared with the previous method of hand feed, as a uniform and continuous supply of abrasive is assured, together with the required amount of water for operating the grinding wheel. The wheel is at all times provided with an ample supply of water and abrasive, and performs its work much faster than when it depends entirely upon the individual attention of the operator.

Operation

Having described the details of construction of my improved grinding machine, it is believed that the details and method of operation will be quite clearly apparent.

As previously stated, a stone is placed upon suitable supports or cross frames 80 in one of the grinding bins, and the cover boards 74, 75 and 76 are positioned to partially cover the wheel and stone after the grinding wheel has been located above the stone. The grinding wheel is then latched to the draw bar 186, which may be adjusted transversely of the bin, if desired, by means of the segment handle 205. The wheel is then started in rotation by applying power through the driving pulley 59 and the elevating motor 150 is used to move the wheel frame and bring the wheel W into contact with the work.

The wheel frame may be further depressed to apply additional pressure to the grinding wheel through the spring 114 (Fig. 14). This spring is of very substantial construction and can be used to apply a very heavy pressure to the stone if desired.

The carriage motor 210 may then be started to automatically reciprocate the wheel carriage and move the wheel back and forth over the stone until the desired finish is obtained thereon. During this operation of the wheel the feed tank 260 will supply a steady stream of abrasive and water to the center of the wheel, so that the grinding operation may be carried out with a minimum loss of time and labor.

It will be noted that all of the controlling devices for the machine are conveniently located at one side of the grinding bin, so that a single operator can easily operate the machine. All parts of the machine are of firm and heavy construction, and the driving belts and pulleys are of unusual width so that the machine can operate with very high efficiency.

As soon as the grinding of one stone is completed the grinding wheel may be swung out of one bin and into the companion bin in which another stone has been previously located, and the grinding operation on the second stone may be continued substantially without interruption.

Having thus described my invention and the advantages thereof, it will be apparent to those skilled in the art that many changes and modifications can be made in my invention within the spirit and scope thereof as set forth in the claims, and I do not wish to be otherwise limited to the details herein disclosed, but what I claim is:—

1. In a stone finishing machine, a wheel, a wheel support, a wheel carriage, a draw bar having a recess in one end to receive said wheel support, and a latch to retain said wheel support in said recess, said latch being formed of a plurality of elements pivoted to each other and one to said draw bar and latch elements having anti-friction rolls engaging said wheel support.

2. A stone finishing machine comprising a rotating wheel, driving mechanism for said wheel, a plurality of bins within each of which a block of stone may be supported, and a rigid foundation for said wheel driving mechanism positioned between two bins, means whereby said wheel may be operated in one bin to perform a grinding operation on the stone therein, and means whereby said wheel may be operated in the other bin to perform a similar grinding operation on the stone therein.

3. A stone finishing machine comprising a rotating wheel, driving mechanism for said wheel, a plurality of bins within each of which a block of stone may be supported, and a rigid foundation for said wheel driving mechanism positioned between two bins whereby said wheel may be operated in either bin, means to adjust said wheel to perform a grinding operation in either one of said bins.

4. A stone finishing machine comprising a rotating wheel, driving mechanism for said wheel, a plurality of bins within each of which a block of stone may be supported, and a rigid foundation for said wheel driving mechanism positioned between two bins, means whereby said wheel may be operated in one bin to perform a grinding operation, means whereby said wheel may be operated in the other bin to perform a similar grinding operation, and automatic means to reciprocate said wheel in either bin.

5. A stone finishing machine comprising a rotating wheel, driving mechainsm therefor, a plurality of bins within each of which a block of stone may be supported, independent means at each bin for reciprocating said wheel therealong, and means to permit a lateral shifting of said wheel and mechanism from one bin to another.

6. A stone finishing machine comprising a rotating wheel, driving mechanism therefor, a plurality of bins within each of which a block of stone may be supported, independent means at each bin for reciprocating said wheel therealong, comprising disengageable wheel mountings on said bins, said wheel and mechanism being adapted to interchangeably utilize said mountings.

7. A stone finishing machine comprising a rotating wheel, driving mechanism therefor, a plurality of bins within each of which a block of stone may be supported, independent means at each bin for reciprocating said wheel therealong, means to permit a lateral shifting of said wheel and mechanism from one bin to the other, and means for laterally shifting said wheel with respect to the reciprocation thereof and across one bin.

8. A stone finishing machine comprising a rotating wheel, driving mechanism therefor, a plurality of bins within each of which a block of stone may be supported, independent means at each bin for reciprocating said wheel therealong, comprising disengageable wheel mountings on said bins, said wheel and mechanism being adapted to interchangeably utilize said mountings, and means to permit a lateral shifting of said wheel and mechanism from one bin to another.

9. A stone finishing machine comprising a rotating wheel, driving mechanism therefor, a plurality of bins within each of which a block of stone may be supported, independent means at each bin for reciprocating said wheel therealong, comprising disengageable wheel mountings on said bins, said wheel and mechanism being adapted to interchangeably utilize said mountings, means to permit a lateral shifting of said wheel and mechanism from one bin to another, and means for shifting said wheel laterally with respect to the reciprocation thereof and across one bin.

10. A stone finishing machine comprising a rotating wheel, driving mechanism therefor, a plurality of bins within each of which a block of stone may be supported, independent means at each bin for reciprocating said wheel therealong, comprising disengageable wheel mountings on said bins, said wheel and mechanism being adapted to interchangeably utilize said mountings, means to permit a lateral shifting of said wheel and mechanism from one bin to another and means for shifting said wheel laterally with respect to the reciprocation thereof and across one bin, comprising a draw bar mounted transversely of the path of wheel travel and connected to said wheel.

11. A stone finishing wheel comprising a rotating wheel, driving mechanism for said wheel, a plurality of bins within each of which a block of stone may be supported in fixed position, a wheel carriage mounted on each of said bins, disengageable means for mounting said wheel and its driving means interchangeably upon either reciprocating carriage, means for laterally shifting said wheel across one bin, comprising a draw bar mounted transversely of the path of wheel travel and connected to said wheel, and means to interchangeably utilize said draw bar on any bin.

12. A stone finishing machine comprising a rotating wheel, driving mechanism therefor, a plurality of bins within each of which a block of stone may be supported, means for reciprocating said wheel, means to permit a lateral shifting of said wheel and mechanism from one bin to another, and means for laterally shifting said wheel across one bin to thereby position the wheel with respect to the stone in said bin, said means comprising a draw bar mounted transversely of the path of the wheel travel and connected to said wheel.

13. A stone finishing machine comprising a rotating wheel, driving mechanism therefor, a plurality of bins within each of which a block of stone may be supported, independent means at each bin for reciprocating said wheel therealong, and means to raise and lower the wheel and mechanism, so mounted that they may be laterally shifted from one bin to another.

14. A stone finishing machine comprising a rotating wheel, driving mechanism therefor, a plurality of bins within each of which a block of stone may be supported, independent means at each bin for reciprocating said wheel therealong, and means to raise and lower the wheel and mechanism, so mounted that they may be laterally shifted from one bin to another, and means for laterally shifting said wheel with respect to the reciprocation thereof and across one bin.

15. A stone finishing machine, comprising a wheel, driving mechanism for said wheel, a plurality of bins within each of which a block of stone may be supported, a rigid foundation for said wheel driving mechanism positioned between the bins, whereby said wheel may be operated and rotated in one bin or another, and automatic means to reciprocate said wheel in either bin during such rotation, each of said bins having its own independent means for reciprocating the wheel therein, said wheel rotating means being shiftable with the wheel laterally of and from one reciprocating means to the other.

16. A stone finishing machine, comprising a rotating wheel, driving mechanism therefor, a bin within which a block of stone may be supported, means at said bin for reciprocating said wheel therealong, and means to raise and lower the wheel and mechanism, the wheel and mechanism being so mounted that the wheel may be shifted in transverse directions over an area substantially equal to that of the bin, and so that they may be laterally shifted from within the bin to without the same, while maintaining freedom of traversing motion to the same extent in either position.

17. A stone finishing machine, comprising a rotating wheel, driving mechanism for said wheel, a bin within which a block of stone may be supported, a rigid foundation for said wheel, driving mechanism positioned adjacent the bin, means whereby the wheel may be shifted within the bin in transverse directions over an area substantially equal to that of the bin, the wheel and driving mechanism being so mounted that they may be laterally shifted from within the bin to without the same while maintaining freedom of traversing motion to the same extent in either position.

18. A stone finishing machine, comprising a rotating wheel, driving mechanism for said wheel, a bin within which a block of stone may be supported, a rigid foundation for said wheel, driving mechanism positioned adjacent the bin, means whereby the wheel may be shifted within the bin in transverse directions over an area substantially equal to that of the bin, the wheel and driving mechanism being so mounted that they may be laterally shifted from within the bin to without the same while maintaining freedom of traversing motion to the same extent in either position, and automatic means to reciprocate said wheel in either position.

19. A stone finishing machine, comprising a rotating wheel, driving mechanism therefor, a bin within which a block of stone may be supported, means at said bin for reciprocating said wheel therealong, said wheel and driving mechanism being so mounted that the wheel may be shifted in transverse directions over an area substantially equal to that of the bin, and so that they may be laterally shifted from within the bin to without the same while maintaining freedom of traversing motion to the same extent.

20. A stone finishing machine, comprising a rotating wheel, driving mechanism therefor, a bin within which a block of stone may be supported, means at said bin for reciprocating said wheel therealong, said wheel and driving mechanism being so mounted that the wheel may be shifted in transverse directions over an area substantially equal to that of the bin, and so that they may be laterally shifted from within the bin to without the same while maintaining freedom of traversing motion to the same extent, and means for laterally shifting said wheel with respect to the reciprocation thereof and across the bin.

21. A stone finishing machine comprising a rotaing wheel, driving mechanism therefor, a bin within which a block of stone may be supported, means at said bin for reciprocating said wheel therealong, said wheel and driving mechanism being so mounted that the wheel may be shifted in transverse directions over an area substantially equal to that of the bin, and so that they may be laterally shifted from within the bin to without the same while maintaining freedom of traversing motion to the same extent, and means for laterally shifting said wheel across the bin, thereby to position the wheel with respect to the stone in the bin, said means comprising a draw bar mounted transversely of the path of wheel travel and connected to said wheel.

In testimony whereof I have hereunto affixed my signature.

ELROY A. CHASE.